(12) United States Patent
Shippen

(10) Patent No.: US 7,250,132 B1
(45) Date of Patent: Jul. 31, 2007

(54) APPARATUS FOR ENABLING FABRICATION OF ACCURATE ANGULAR CUTS IN A PIPE

(76) Inventor: William G. Shippen, 4412 N. State Rd. 17, Pretty Prairie, KS (US) 67570

( * ) Notice: Subject to any disclaimer, the term of this patent is extended or adjusted under 35 U.S.C. 154(b) by 0 days.

(21) Appl. No.: 11/542,897

(22) Filed: Oct. 4, 2006

(51) Int. Cl.
*B23K 7/00* (2006.01)

(52) U.S. Cl. .......................................... 266/54; 266/48
(58) Field of Classification Search .................. 266/48, 266/54, 55, 56
See application file for complete search history.

(56) References Cited

U.S. PATENT DOCUMENTS

| | | | |
|---|---|---|---|
| 2,417,412 A * | 3/1947 | Herbst | 266/56 |
| 2,687,880 A * | 8/1954 | Waterson | 266/56 |
| 2,805,057 A | 9/1957 | Bain | |
| 2,848,215 A | 8/1958 | Pendergrass | |
| 3,206,180 A | 9/1965 | Grubish | |
| 3,900,346 A | 8/1975 | Muller et al. | |
| 4,312,498 A | 1/1982 | Whiteside | |
| 4,323,223 A | 4/1982 | Noll | |
| 4,667,936 A | 5/1987 | Hale, Jr. | |
| 4,695,041 A | 9/1987 | Clites | |
| D341,784 S | 11/1993 | Ard | |

FOREIGN PATENT DOCUMENTS

JP 358223518 A 12/1983

* cited by examiner

*Primary Examiner*—Scott Kastler
(74) *Attorney, Agent, or Firm*—John R. Flanagan

(57) ABSTRACT

An apparatus for enabling fabrication of accurate angular cuts in a pipe includes a first fixture adapted to be clamped on a pipe and adjusted relative to the pipe so as to define a substantially planar surface aligned with a desired cut angle relative to a longitudinal axis of the pipe and a second fixture adapted to mount a cutting torch and enable sliding the mounted cutting torch on the planar surface defined by the first fixture and relative to the pipe such that the torch can fabricate a cut in the pipe at the desired cut angle.

19 Claims, 6 Drawing Sheets

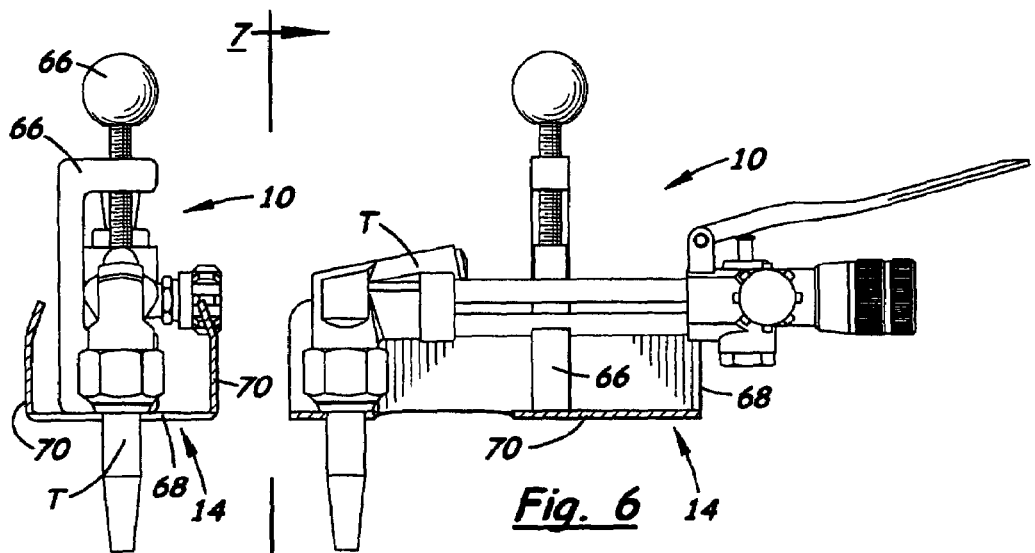
*Fig. 7*  *Fig. 6*
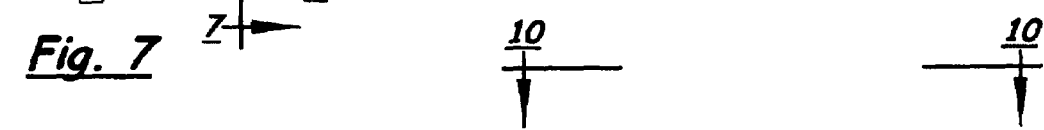
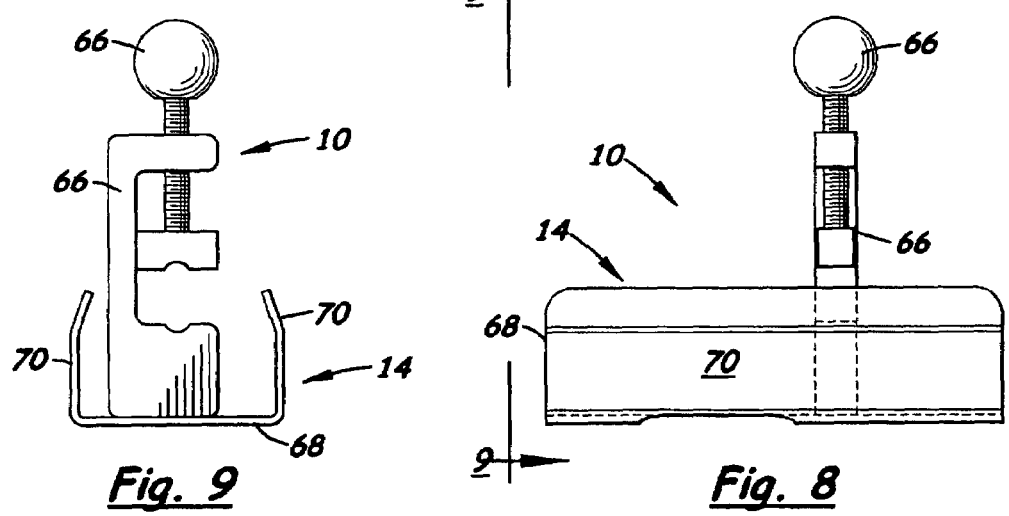
*Fig. 9*  *Fig. 8*
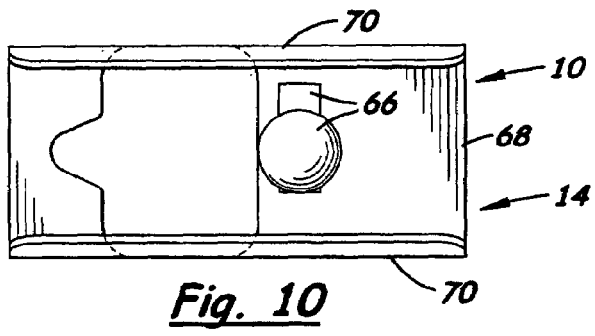
*Fig. 10*

APPARATUS FOR ENABLING FABRICATION OF ACCURATE ANGULAR CUTS IN A PIPE

BACKGROUND OF THE INVENTION

1. Field of the Invention

The present invention generally relates to a pipe cutting devices and, more particularly, is concerned with an apparatus for enabling fabrication of accurate angular cuts in a pipe.

2. Description of the Prior Art

The most difficult cut to make in a pipe using a cutting torch is a cope angle cut, also known as a "fish mouth" or "saddle" cut. Achieving an accurate cut freehand using a cutting torch is exceedingly difficult, if not impossible.

One attempt to reduce such difficulty is the provision of a pattern for assistance in accurately marking a desired cope angle on a pipe. However, before the cut is actually made in the pipe along the marked angle using the torch, the pattern is removed so that it will not be burned or cut by the torch. With such limitation on the use of the pattern, the user is again faced with the difficult task of essentially making an accurate freehand cut in the pipe along a marked angle.

As a consequence, there still exists a need for an innovation that will overcome the aforementioned difficulty experienced in the prior art without introducing any new one in place thereof.

SUMMARY OF THE INVENTION

The present invention is designed to satisfy the aforementioned need by providing an apparatus which enables or assists in the fabrication of accurate angular cuts in a pipe. The apparatus of the present invention employs first and second fixtures which can be set up for cooperation together so as to allow a user to make accurate angular cuts in a pipe at any one of a wide range of angles relative to the longitudinal axis of the pipe. The second fixture employs part of the structure of an cutting torch attachment device disclosed in U.S. Pat. No. 5,511,765 by the inventor herein so as to extend its application from facilitating circular and straight cuts to angular pipe cuts.

Accordingly, the present invention is directed to an apparatus for enabling fabrication of accurate angular cuts in a pipe which comprises a first fixture adapted to be clamped on a pipe and adjusted relative to the pipe so as to define a substantially planar surface aligned with a desired cut angle relative to a longitudinal axis of the pipe. The apparatus further comprises a second fixture adapted to mount a cutting torch and enable sliding the mounted cutting torch on the planar surface defined by the first fixture and relative to the pipe such that the torch can fabricate a cut in the pipe at the desired cut angle relative to the longitudinal axis of the pipe.

More particularly, the first fixture includes a pair of opposing clamp members for positioning in an operative clamping relationship on a pair of opposite sides of the pipe and means for securing the opposing clamp members in the operative clamping relationship on the opposite sides of the pipe. Each opposing clamp member has a body with opposite ends and an arm with opposite inner and outer ends. The arm is rigidly fixed at its inner end to the body so as to extend transversely to and outwardly from the body and the opposite sides of the pipe.

The first fixture further includes a pair of slide rods and a pair of opposing guide plates. Each slide rod has inner and outer ends and is rigidly attached at its inner end to one of the opposite ends of the body of one of the opposing clamp members. The slide rods also extend outwardly in opposite directions relative to one another from the one opposite end of the bodies. The guide plates together define the substantially planar surface of the first fixture. Each guide plates is slidably mounted on one of the slide rods such that the guide plates are capable of undergoing slidably adjustable displacement toward and away from the opposite sides of the pipe disposed between the opposing clamp members to desired positions relative to one another so as to adapt the first fixture to be clamped on pipes of different diameters. Each guide plate also is pivotally mounted on one of the slide rods such that the guide plates are positionable at a desired angle of inclination relative to a horizontal reference plane so as to provide the substantially planar surface of the guide plates aligned with the desired cut angle relative to a longitudinal axis of the pipe.

Further, the second fixture includes an attachment structure clampable to the cutting torch; and a shoe supporting the attachment structure and having a substantially flat surface to permit sliding of the shoe and the cutting torch therewith, along the planar surface as defined by a selected one of the guide plates of the first fixture, next to one of the opposite sides of pipe such that the torch can make the cut in the pipe of the desired angle relative to the longitudinal axis of the pipe.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 6 is a longitudinal sectional view of the second fixture of the apparatus with the cutting torch supported thereon.

FIG. 7 is an end elevational view of the second fixture and cutting torch as seen along line 7-7 of FIG. 6.

FIG. 8 is a side elevational view of the second fixture without the cutting torch.

FIG. 9 is an end elevational view of the second fixture as seen along line 9-9 of FIG. 8.

FIG. 10 is a top plan view of the second fixture as seen along line 10-10 of FIG. 8.

DETAILED DESCRIPTION OF THE INVENTION

Figure 1:
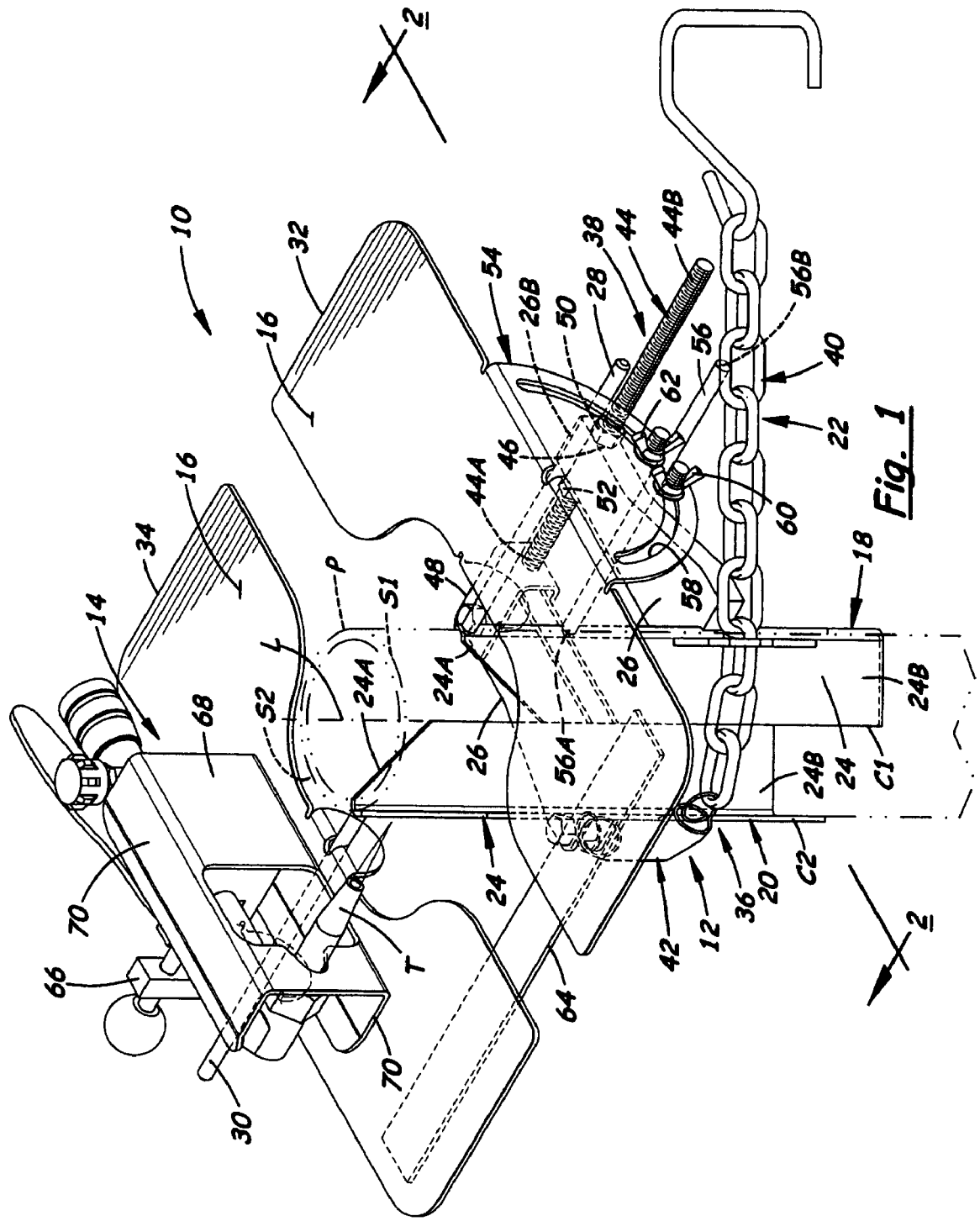
FIG. 1 is a perspective view of an apparatus of the present invention for enabling fabrication of accurate angular cuts in a pipe, the apparatus being shown with its first fixture clamped on a pipe and set in a position relative to the pipe such that its second fixture which mounts a cutting torch can be moved on the first fixture and relative to the pipe so that the cutting torch can make a desired angular, such as approximately a 90 degree, cut in the pipe.
Figure 2:
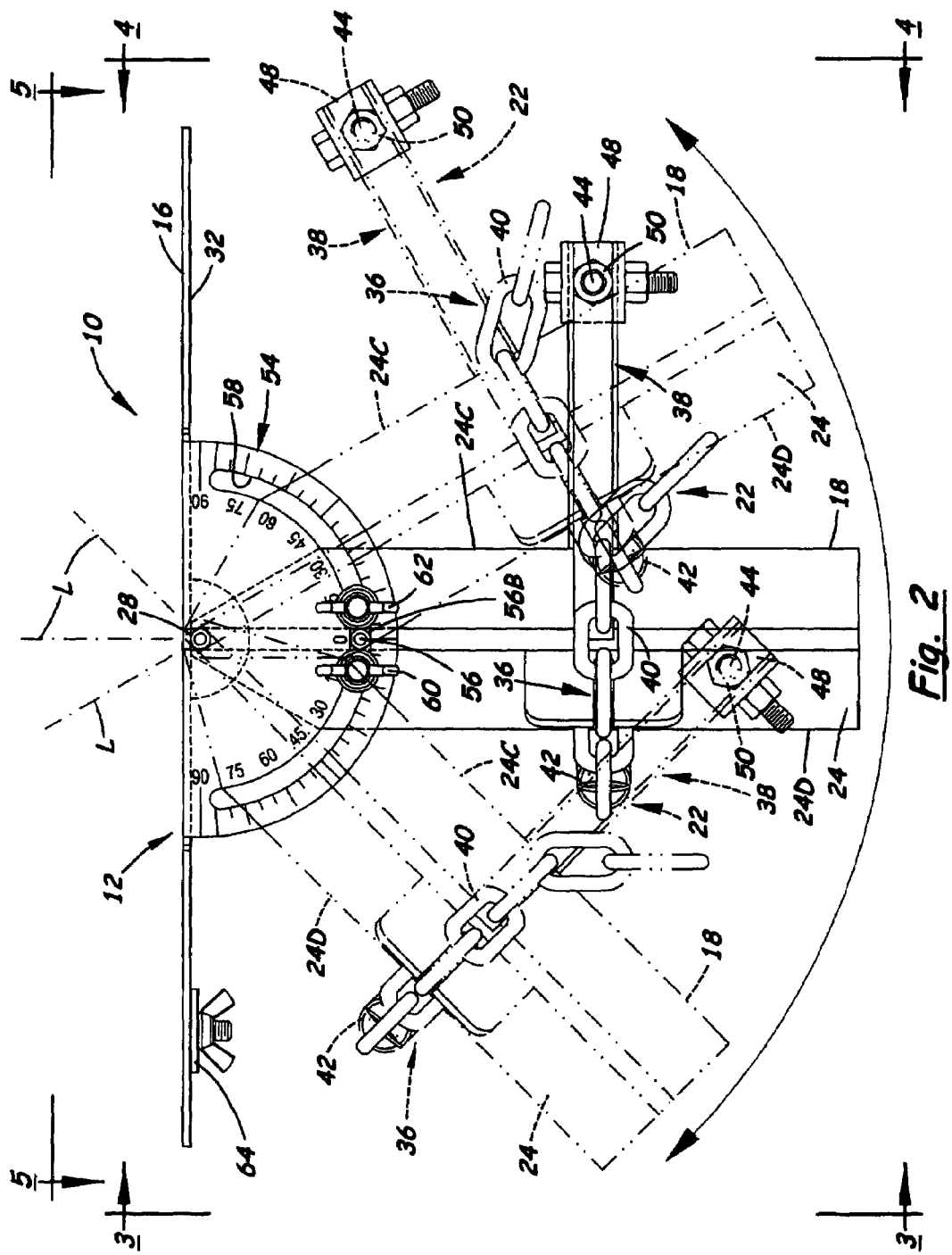
FIG. 2 is a side elevational view of the first fixture of the apparatus as seen along line 2-2 of FIG. 1 with the second fixture and cutting torch omitted and showing in solid line form the position of the pipe relative to the planar surface of the first fixture as seen in FIG. 1 and also showing in dashed line form two of many possible angular positions of the pipe relative to the planar surface of the first fixture.
Figure 3:
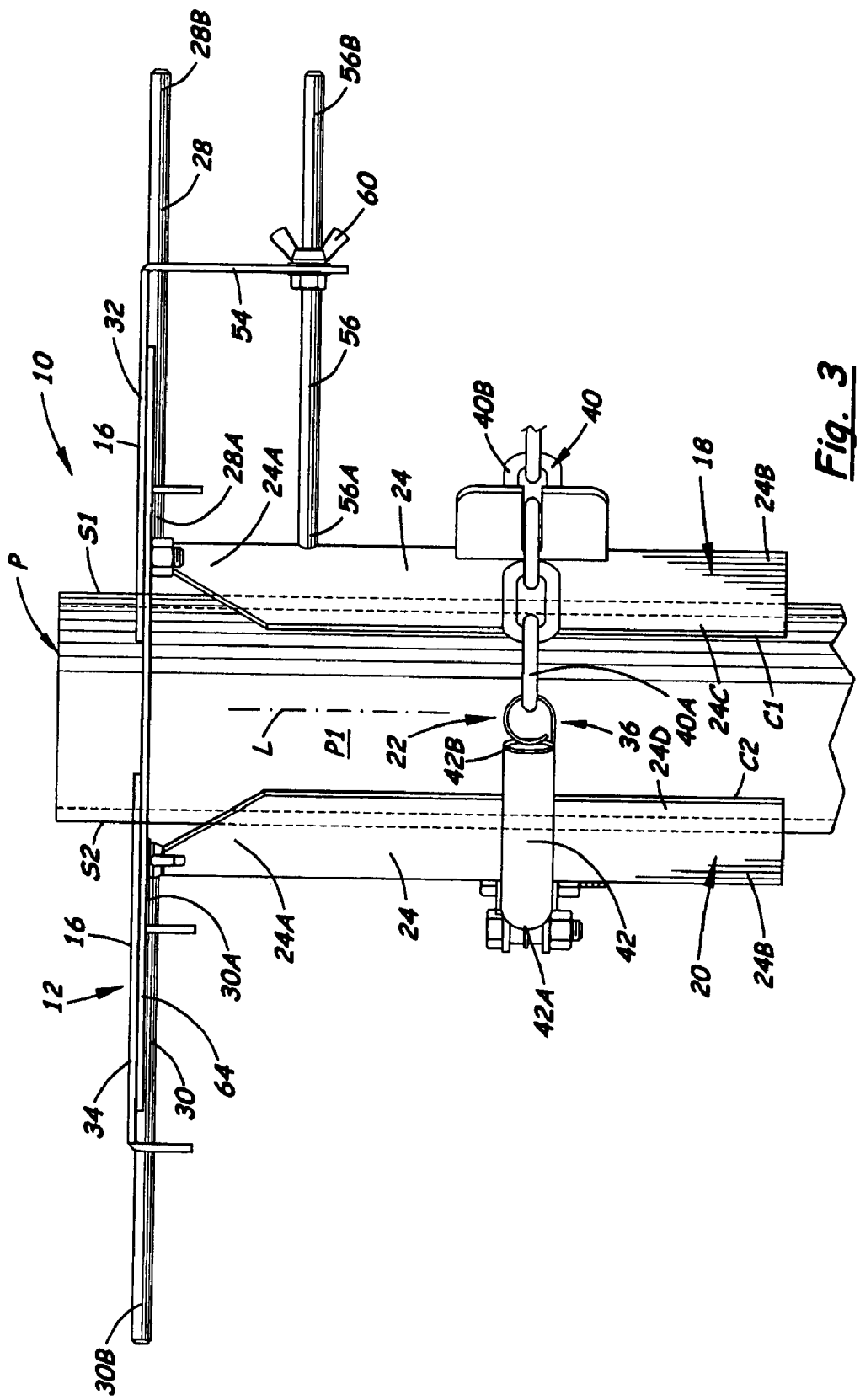
FIG. 3 is a front elevational view of the first fixture as seen along line 3-3 of FIG. 2.
Figure 4:
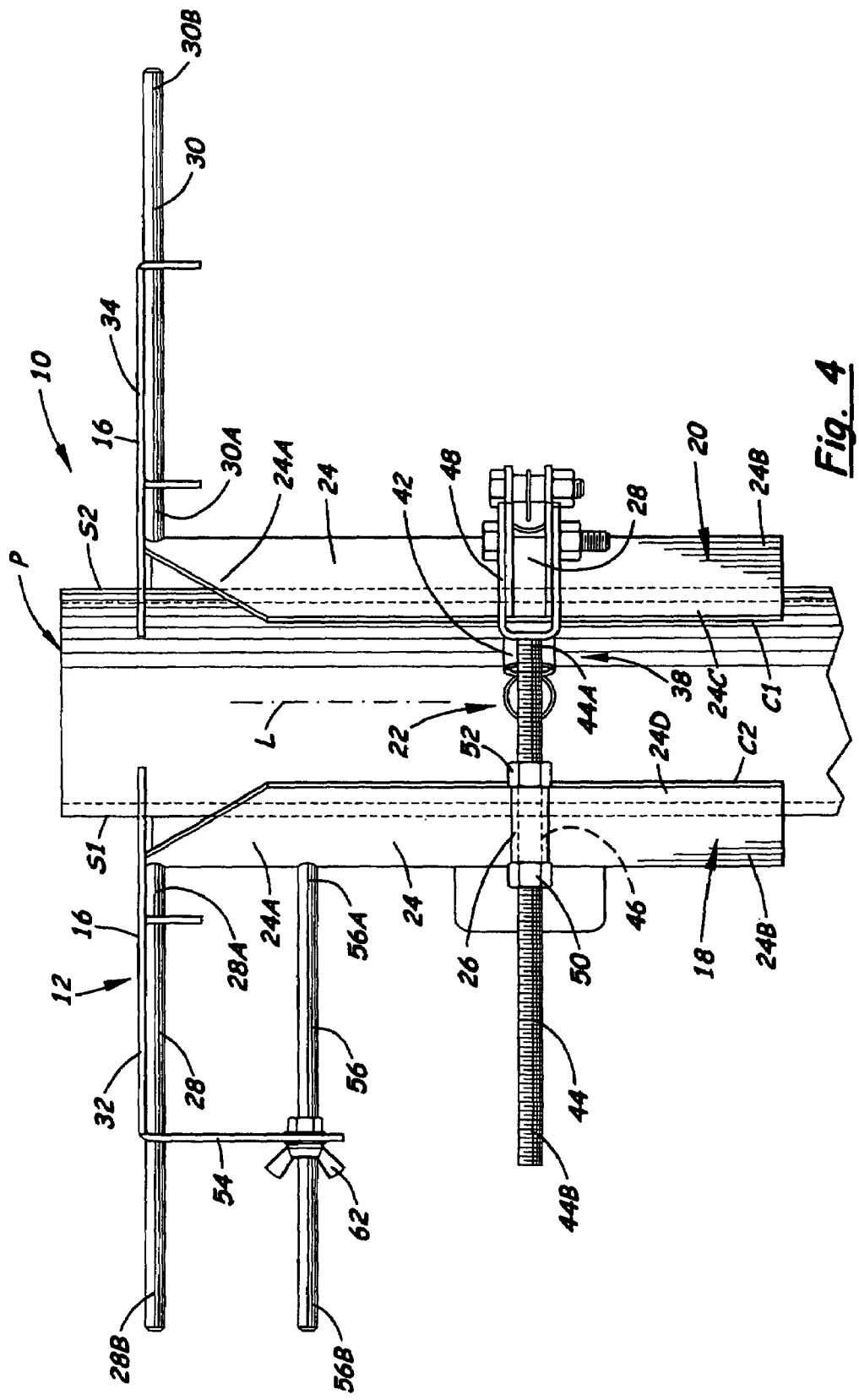
FIG. 4 is a rear elevational view of the first fixture as seen along line 4-4 of FIG. 2.
Figure 5:
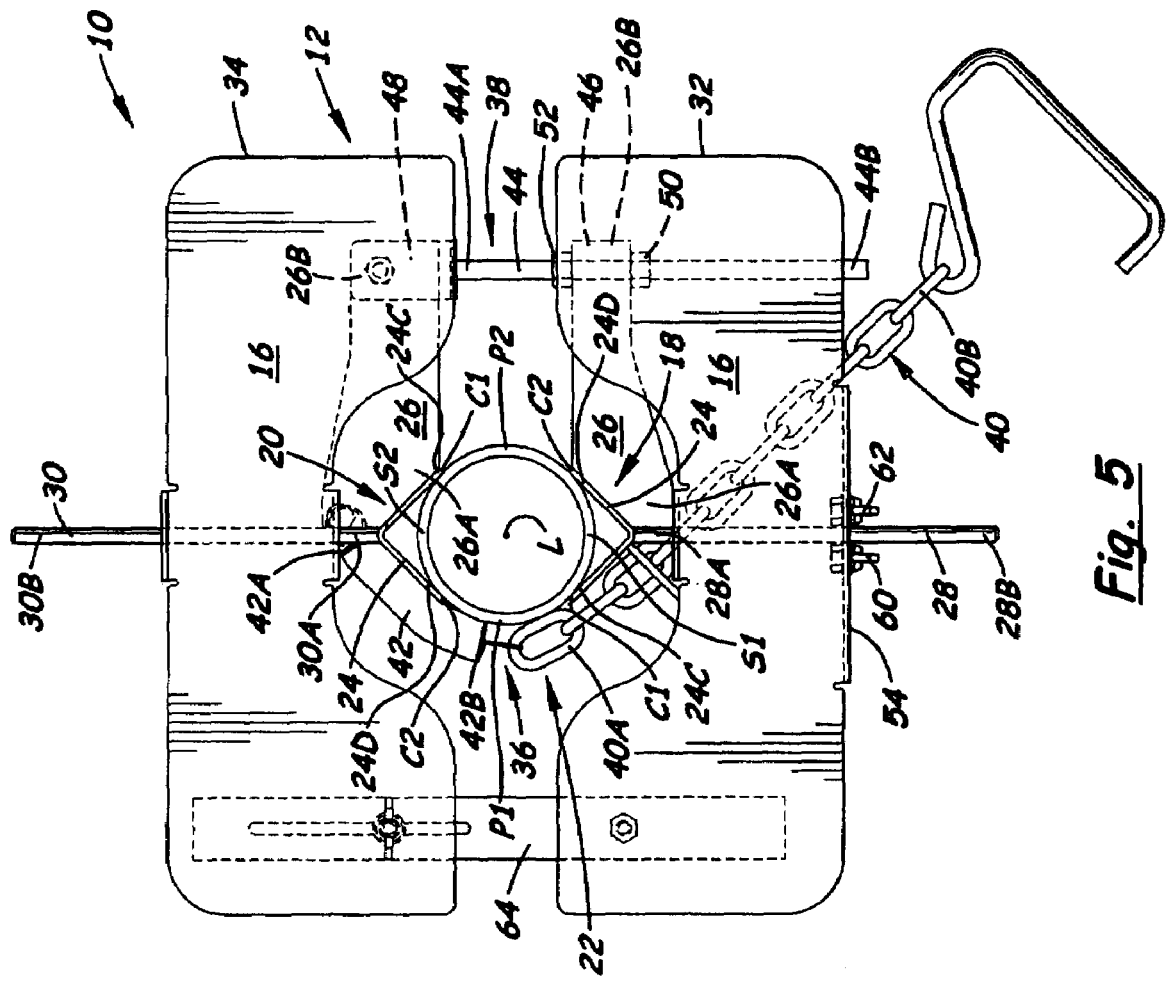
FIG. 5 is a top plan view of the first fixture as seen along line 5-5 of FIG. 2.

Referring to the drawings and particularly to FIG. 1, there is illustrated an apparatus of the present invention, generally designated 10, for enabling fabrication of accurate angular cuts in a pipe P. Basically, the apparatus 10 of the present invention includes a first fixture 12 and a second fixture 14. The first fixture 12 is adapted to be clamped on a pipe P and adjusted relative to the pipe P so as to define a substantially planar surface 16 aligned with a desired cut angle, such as approximately 90 degrees, relative to a longitudinal axis L of the pipe P. The second fixture 14 is adapted to mount a cutting torch T and to enable sliding the mounted torch T on the planar surface 16 defined by the first fixture 12 and relative to the pipe P such that the torch T can fabricate the cut in the pipe P at the desired cut angle relative to the longitudinal axis L of the pipe P.

More particularly, referring now to FIGS. 1-5, the first fixture includes opposing first and second clamp members 18, 20 for positioning in an operative clamping relationship on a pair of opposite sides S1, S2 of the pipe P and means, generally designated 22, for securing the opposing first and second clamp members 18, 20 in the operative clamping relationship on the opposite sides S1, S2 of the pipe P. Each clamp member 18, 20 has a body 24, being substantially, but not necessarily, identical to one another, with opposite ends 24A, 24B, and an arm 26 with opposite inner and outer ends 26A, 26B. The arm 26 is rigidly fixed at its inner end 26A to the body 24 so as to extend transversely to and outwardly from the body 24 and the opposite sides S1, S2 of the pipe P. The body 24 of each clamp member 18, 20 has a pair of spaced apart portions 24C, 24D adapted to engage the exterior of a corresponding one of the opposite sides S1, S2 of the pipe P along spaced apart parallel lines of contact C1, C2 which extend substantially parallel to the longitudinal axis L of the pipe P.

The first fixture 12 further includes first and second slide rods 28, 30 and first and second guide plates 32, 34. Each slide rod 28, 30 has inner and outer ends 28A, 28B, 30A, 30B and is rigidly attached at its inner end 28A, 30A to one of the opposite ends 24A, 24B of the body 24 of one of the first and second clamp members 18, 20. The slide rods 28, 30 also extend outwardly in opposite directions relative to one another from the one opposite end 24A of the bodies 24. The guide plates 32, 34 together define the substantially planar surface 16 of the first fixture 12. Each guide plates 32, 34 is slidably mounted on one of the slide rods 28, 30 such that the guide plates 32, 34 are capable of undergoing slidably adjustable displacement toward and away from the opposite sides S1, S2 of the pipe P disposed between the clamp members 18, 20 to desired positions relative to one another so as to adapt the first fixture 12 to be clamped on pipes P of different diameters. Each guide plate 32, 34 also is pivotally mounted on one of the slide rods 28, 30 such that the guide plates 32, 34 are positionable at one of a plurality of desired angles of inclination relative to a horizontal reference plane, such as between 0 and 90 degrees, so as to provide the substantially planar surface 16 of the guide plates 32, 34 aligned with the desired cut angle relative to the longitudinal axis L of the pipe P. For convenience of illustration, in FIG. 2 the clamp members 18, 20 and the pipe P are shown positioned at various angles of inclination relative to the planar surface 16 of the guide plates 32, 34 so as to provide the planar surface 16 of the guide plates 32, 34 aligned at the desired cut angles relative to the longitudinal axis L of the pipe P at the various positions.

Further, the securing means 22 of the first fixture 12 includes a first connector 36 and a second connector 38. The first connector 36 is extendable along one portion P1 of the pipe P and between the bodies 24 of the clamp members 18, 20 so as to interconnect the clamp members 18, 20 to one another. The second connector 38 is coupled to and extends between the outer ends 26B of the arms 26 of the clamp members 18, 20 and along another portion P2 of the pipe P opposite the one portion P1 thereof so as to interconnect the clamp members 18, 20 to one another. The second connector 38 is adjustable so as to allow movement of the bodies 24 of the clamp members 18, 20 toward and away from one another and thereby toward and away from the opposite sides S1, S2 of the pipe P so as to either clamp the clamp members 18, 20 along the opposite sides S1, S2 of the pipe P or unclamp them therefrom.

More particularly, the first connector 36 includes a flexible inelastic member 40 having opposite ends 40A, 40B with one 40A being attachable to one of the clamp members 18, 20 and a elongated elastic member 42 having opposite ends 42A, 42B with one 42A being attached to the other 40B of the opposite ends 40A, 40B of the flexible inelastic member 40 such that the first connector 36 when extended along the one portion P1 of the pipe P and between and connected to the clamp members 18, 20 imposes a resiliently yieldable force thereon which pulls the clamp members 18, 20 toward one another. The second connector 38 includes an elongated externally-threaded rod 44 having a pair of opposite ends 44A, 44B and extending through a hole 46 defined through the outer end 26B of one of the arms 26 of the clamp members 18, 20, a clevis 48 attached to one 44A of the opposite ends 44A, 44B of the threaded rod 44 and pivotally connected to the outer end 26B of the other of the arms 26 of the clamp members 18, 20, and a pair of internally threaded lock nuts 50, 52 threaded over the threaded rod 44 such that the lock nuts 50, 52 are adjustably tightenable in opposite directions relative to one another against opposite portions of the outer end 26B of the one of the arms 26 so as to fixedly secure the threaded rod 44 of the second connector 38 thereto such that the first and second connectors 36, 38 coact together to secure the clamp members 18, 20 in the clamping relationship on the pipe P.

The first fixture 12 also includes a protractor 54 attached to the first guide plate 32 so as to permit a user to select and set the angle of inclination of the guide plates 32, 34 at any angle between 0 and 90 degrees. The first fixture 12 further includes a third rod 56 having inner and outer ends 56A, 56B and being rigidly attached at the inner end 56A to the body 24 of one 18 of the clamp members 18, 20. The third rod 56 also extends substantially parallel to one 28 of the first and second slide rods 28, 30 and through an arcuate slot 58 define in the protractor 54. The first fixture 12 still further includes means in the form of wing nuts 60, 62 which fit through and are slidable along the arcuate slot 58 for releasably securing the protractor 54 in a fixed position relative to the third rod 56 in order to secure the guide plates 32, 34 at a selected one of the angles between 0 and 90 degrees. The first fixture 12 may further include a link 64 extending between the guide plates 32, 34 and releasably and adjustably attached to at least one of the guide plates 32 so as to stabilize and retain the guide plates 32, 34 at the desired positions relative to one another.

Referring now to FIGS. 1 and 6-10, the second fixture 14 includes an attachment structure 66 clampable to the cutting torch T and a shoe 68 supporting the attachment structure 66. The shoe 68 has a substantially flat surface 70 to permit sliding of the shoe 68 and the cutting torch T therewith, as seen in FIG. 1, along the planar surface 16 as defined by a selected one of the guide plates 32, 34 of the first fixture 12, next to one of the opposite sides S1, S2 of pipe P such that the torch T can make a cut in the pipe P of the desired angle relative to the longitudinal axis L of the pipe P.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An apparatus for enabling fabrication of accurate angular cuts in a pipe, said apparatus comprising:
    a first fixture adapted to be clamped on a pipe and adjusted relative to the pipe so as to define a substantially planar surface aligned with a desired cut angle relative to a longitudinal axis of the pipe, said first fixture including
        (a) a pair of opposing clamp members for disposing in an operative clamping relationship on opposite sides of the pipe, each of the opposing clamp members having a body with opposite ends and an arm with inner and outer ends, said arm being rigidly fixed at said inner end to said body so as to extend transversely to and outwardly from said body and the opposite sides of the pipe; and
        (b) means for securing said opposing clamp members in said operative clamping relationship on the opposite sides of the pipe.

2. The apparatus of claim 1 wherein said body of each of said opposing clamp members has a pair of spaced apart portions adapted to engage the exterior of one of the opposite sides of the pipe along spaced apart parallel lines of contact which extend substantially parallel to the longitudinal axis of the pipe.

3. The apparatus of claim 1 wherein said securing means of said first fixture includes:
    a first connector extendable along one portion of the pipe and between said bodies of said opposing clamp members so as to interconnect said opposing clamp members to one another; and
    a second connector coupled to and extending between said outer ends of said arms of said opposing clamp members and along another portion of the pipe opposite the one portion thereof so as to interconnect said opposing clamp members to one another, said second connector being adjustable so as to allow movement of said bodies of said clamp members toward and away from one another and thereby toward and away from the opposite sides of the pipe so as to either clamp said clamp members along the opposite sides of the pipe or unclamp them therefrom.

4. The apparatus of claim 3 wherein said first connector of said securing means includes:
    a flexible inelastic member having opposite ends with one being attachable to one of said opposing clamp members; and
    a elongated elastic member having opposite ends with one being attached to the other of said opposite ends of said flexible inelastic member such that said first connector when extended along the one portion of the pipe and between and connected to said opposing clamp members imposes a resiliently yieldable force thereon which pulls said clamp members toward one another.

5. The apparatus of claim 3 wherein said second connector of said securing means includes:
    an elongated externally-threaded rod having a pair of opposite ends and extending through a hole defined through said outer end of one of said arms of said opposing clamp members;
    a clevis attached to one of said opposite ends of said threaded rod and pivotally connected to said outer end of the other of said arms of said opposing clamp members; and
    a pair of internally threaded lock nuts threaded over said threaded rod such that said lock nuts are adjustably tightenable in opposite directions relative to one another against opposite portions of said outer end of said one of said arms so as to fixedly secure said threaded rod of said second connector thereto such that said first and second connectors coact together to secure said opposing clamp members in said clamping relationship on said pipe.

6. The apparatus of claim 1 wherein said first fixture still further includes:
    a pair of elongated slide rods each having inner and outer ends and each rigidly attached at said inner end to one of said opposite ends of said body of one of said opposing clamp members, said slide rods also extending outwardly in opposite directions relative to one another from said respective one opposite ends of said bodies;
    a pair of opposing guide plates each defining said substantially planar surface of said first fixture, each of said opposing guide plates being slidably mounted on one of said slide rods such that said guide plates are capable of undergoing slidably adjustable displacement toward and away from the opposite sides of the pipe disposed between said opposing clamp members to desired positions relative to one another so as to adapt said first fixture to be clamped on pipes of different diameters, each of said opposing guide plates also being pivotally mounted on one of said slide rods such that said guide plates are positionable at a desired angle of inclination relative to a horizontal reference plane so as to provide said substantially planar surface of said guide plates aligned with the desired cut angle relative to a longitudinal axis of the pipe.

7. The apparatus of claim 6 wherein said first fixture yet further includes:
    a protractor attached to one of said guide plates so as to permit a user to select and set said angle of inclination of said guide plates at any angle between zero and ninety degrees;
    a third rod having inner and outer ends and being rigidly attached at said inner end to said body of one of said opposing clamp members, said third rod also extending substantially parallel to one of said slide rods and through an arcuate slot define in said protractor; and
    means for releasably securing said protractor in a fixed position relative to said third rod in order to secure said guide plates at a selected one of said angles between zero and ninety degrees.

8. The apparatus of claim 6 wherein said first fixture still further includes a link extending between said guide plates and being releasably and adjustably attached to at least one of said guide plates so as to stabilize and retain said guide plates at said desired positions relative to one another.

9. The apparatus of claim 1 further comprising:
a second fixture adapted to mount a cutting torch and enable sliding the mounted cutting torch on said planar surface defined by said first fixture and relative to the pipe such that the torch can fabricate a cut in the pipe at the desired cut angle relative to the longitudinal axis of the pipe.

10. The apparatus of claim 9 wherein said second fixture includes:
an attachment structure clampable to the cutting torch; and
a shoe supporting said attachment structure and having a substantially flat surface to permit sliding of said shoe and the cutting torch therewith, along said planar surface as defined by a selected one of said guide plates of said first fixture, next to one of the opposite sides of pipe such that the torch can make a cut therein of the desired angle relative to the longitudinal axis of the pipe.

11. An apparatus for enabling fabrication of accurate angular cuts in a pipe, said apparatus comprising:
a first fixture adapted to be clamped on a pipe and adjusted relative to the pipe so as to define a substantially planar surface aligned with a desired cut angle relative to a longitudinal axis of the pipe, said first fixture including
(a) a pair of opposing clamp members for disposing in an operative clamping relationship on opposite sides of the pipe;
(b) means for securing said opposing clamp members in said operative clamping relationship on the opposite sides of the pipe;
(c) a pair of elongated slide rods each rigidly attached to one of said opposing clamp members and extending outwardly in opposite directions relative to one another from said opposing clamp members; and
(d) a pair of opposing guide plates each defining said substantially planar surface of said first fixture, each of said opposing guide plates being slidably mounted on one of said slide rods such that said guide plates are capable of undergoing slidably adjustable displacement toward and away from the opposite sides of the pipe disposed between said opposing clamp members to desired positions relative to one another so as to adapt said first fixture to be clamped on pipes of different diameters, each of said opposing guide plates also being pivotally mounted on one of said slide rods such that said guide plates are positionable at a desired angle of inclination relative to a horizontal reference plane so as to provide said substantially planar surface of said guide plates aligned with the desired cut angle relative to a longitudinal axis of the pipe.

12. The apparatus of claim 11 wherein each of said opposing clamp members has a body with opposite ends and an arm with inner and outer ends, said arm being rigidly fixed at said inner end to said body so as to extend transversely to and outwardly from said body and the opposite sides of the pipe.

13. The apparatus of claim 12 wherein said first fixture further includes:
a protractor attached to one of said guide plates so as to permit a user to select and set said angle of inclination of said guide plates at any angle between zero and ninety degrees;
a third rod rigidly attached at an end to one of said opposing clamp members and extending substantially parallel to one of said slide rods and through an arcuate slot define in said protractor; and
means for releasably securing said protractor in a fixed position relative to said third rod in order to secure said guide plates at a selected one of said angles between zero and ninety degrees.

14. The apparatus of claim 13 wherein said first fixture still further includes a link extending between said guide plates and being releasably and adjustably attached to at least one of said guide plates so as to stabilize and retain said guide plates at said desired positions relative to one another.

15. The apparatus of claim 11 further comprising:
a second fixture adapted to mount a cutting torch and enable sliding the mounted cutting torch on said planar surface defined by said first fixture and relative to the pipe such that the torch can fabricate a cut in the pipe at the desired cut angle relative to the longitudinal axis of the pipe.

16. An apparatus for enabling fabrication of accurate angular cuts in a pipe, said apparatus comprising:
(a) a first fixture adapted to be clamped on a pipe and adjusted relative to the pipe so as to define a substantially planar surface aligned with a desired cut angle relative to a longitudinal axis of the pipe, said first fixture including
(i) a pair of opposing clamp members for disposing in an operative clamping relationship on opposite sides of the pipe, each of the opposing clamp members having a body with opposite ends and an arm with inner and outer ends, said arm being rigidly fixed at said inner end to said body so as to extend transversely to and outwardly from said body and the opposite sides of the pipe,
(ii) means for securing said opposing clamp members in said operative clamping relationship on the opposite sides of the pipe,
(iii) a pair of elongated slide rods each having inner and outer ends and each rigidly attached at said inner end to one of said opposite ends of said body of one of said opposing clamp members, said slide rods also extending outwardly in opposite directions relative to one another from said respective one opposite ends of said bodies, and
(iv) a pair of opposing guide plates each defining said substantially planar surface of said first fixture, each of said opposing guide plates being slidably mounted on one of said slide rods such that said guide plates are capable of undergoing slidably adjustable displacement toward and away from the opposite sides of the pipe disposed between said opposing clamp members to desired positions relative to one another so as to adapt said first fixture to be clamped on pipes of different diameters, each of said opposing guide plates also being pivotally mounted on one of said slide rods such that said guide plates are positionable at a desired angle of inclination relative to a horizontal reference plane so as to provide said substantially planar surface of said guide plates aligned with the desired cut angle relative to a longitudinal axis of the pipe; and
(b) a second fixture adapted to mount a cutting torch and enable sliding the mounted cutting torch on said planar surface defined by said first fixture and relative to the pipe such that the torch can fabricate a cut in the pipe at the desired cut angle relative to the longitudinal axis of the pipe, said second fixture including (i) an attachment structure clampable to the cutting torch, and (ii) a shoe supporting said attachment structure and having a substantially flat surface to permit sliding of said shoe and the cutting torch therewith, along said planar surface as defined by a selected one of said guide plates of said first fixture, next to one of the opposite sides of pipe such that the torch can make a cut therein of the desired angle relative to the longitudinal axis of the pipe.

17. The apparatus of claim 16 wherein said body of each of said opposing clamp members has a pair of spaced apart portions adapted to engage the exterior of one of the opposite sides of the pipe along spaced apart parallel lines of contact which extend substantially parallel to the longitudinal axis of the pipe.

18. The apparatus of claim 16 wherein said securing means of said first fixture includes:

a first connector extendable along one portion of the pipe and between said bodies of said opposing clamp members so as to interconnect said opposing clamp members to one another; and a second connector coupled to and extending between said outer ends of said arms of said opposing clamp members and along another portion of the pipe opposite the one portion thereof so as to interconnect said opposing clamp members to one another, said second connector being adjustable so as to allow movement of said bodies of said clamp members toward and away from one another and thereby toward and away from the opposite sides of the pipe so as to either clamp said clamp members along the opposite sides of the pipe or unclamp them therefrom.

19. The apparatus of claim 16 wherein said first fixture further includes:

a protractor attached to one of said guide plates so as to permit a user to select and set said angle of inclination of said guide plates at any angle between zero and ninety degrees;

a third rod having inner and outer ends and being rigidly attached at said inner end to said body of one of said opposing clamp members, said third rod also extending substantially parallel to one of said slide rods and through an arcuate slot define in said protractor; and means for releasably securing said protractor in a fixed position relative to said third rod in order to secure said guide plates at a selected one of said angles between zero and ninety degrees.

* * * * *